Inventor.
Karl-Heinz Herrmann.
By
Atty.

United States Patent Office 2,991,361
Patented July 4, 1961

2,991,361
ELECTRON MICROSCOPE COMPRISING A DEVICE FOR FOCUSING THE TERMINAL IMAGE
Karl-Heinz Herrmann, Berlin-Zehlendorf, Germany, assignor to Siemens & Halske Aktiengesellschaft Berlin and Munich, a corporation of Germany
Filed Dec. 10, 1959, Ser. No. 858,701
Claims priority, application Germany Jan. 14, 1959
16 Claims. (Cl. 250—49.5)

This invention is concerned with an electron microscope having apparatus for focusing the terminal image, comprising an electron trap disposed in the terminal image plane.

The focusing of the image is in connection with many electron microscopes effected by alteration of the focal distance or by axially shifting the sample or specimen while observing the image on the viewing screen. The efficiency of this sharp focusing is accordingly so far as resolution is concerned despite the use of customary light-optical aids limited, with respect to recognition of contrasts and sensitivity, by the viewing screen and by the human eye. The sharp focusing, particularly of images lacking contrasts (thin slides) is therefore extraordinarily difficult. A remedial expedient is now and then employed residing in the preparation of a series of differently focused exposures and selection therefrom of the best image. Such a procedure is time consuming, wholly inadequate for routine work, and results moreover in many case in impermissible damage to the sample. The use of auxiliary samples which are rich in contrast, for example, latex, is sometimes also undesired and does not always lead to correct sharp focusing.

It is further known to effect sharp focusing or sharp definition of the image by simultaneous irradiation of a specimen from several discrete directions. The sharpness of the image in depth is thereby reduced and sharp definition is facilitated.

A similar operation is effected by known wobbling of the irradiation direction, utilizing, in connection with a suitable electron trap in the terminal image plane and an amplifier, the disappearance of an alternating current as a criterion for the sharp definition.

However, the disadvantage of these two procedures resides in the fact that the sharp focusing or definition is effected with altered irradiation conditions as compared with successive exposures. More particularly, the appearance of phase contrast effects, leading in slightly under-focused condition to a maximum image contrast, is neglected in the focusing, thus resulting in deviations from the sharp definition.

The object underlying the invention is to make it possible to effect sharp definition of the image of an electron microscope with electron trap in the terminal image plane, without observation of the image on the viewing screen, while avoiding the disadvantages of prior procedures.

In order to achieve this object, the electron microscope is at a suitable place, in the imaging part thereof, provided with a device which effects a periodic motion of the terminal image relative to the electron trap, while the latter is connected with an amplifier adapted to amplify only a narrow frequency band in the range of the highest harmonic wave of the received electron current, the amplitude of which is made visible on an indicating instrument connected with the amplifier.

The electron trap is disposed in the terminal image plane; its sensitive surface is smaller than the smallest detail of the specimen that can be resolved. The electron current, which is received during the relative motion of the terminal image with respect to the electron trap, reflects along a given path, in periodic sequence, the current density distribution in the terminal image. According to Fourier, the current density distribution may be subdivided into harmonic waves. Inasmuch as a sharply defined image distinguishes from an unsharp image, due to its steep flanks, by a higher content of harmonic waves, the amplifier for the received electron current is so narrow as to its band, that it will (for reasons of limited resolution of the electron microscope or details contained in the image) amplify only in the range of the highest harmonic wave that is to be expected. The highest amplitude appearing on the indicating instrument is then the criterion for the best definition of the image.

The device for periodically moving the terminal image (for example, 30–50 cycles) with respect to the electron trap may be constructed so as to effect periodic reciprocating motion of the viewing screen relative to the electron trap, with the terminal image standing still, or to move the terminal image in a reciprocating motion by periodically deflecting the electron beam. The device produces in this case a periodic, preferably sawtooth-like deflection field. The terminal image is thereby periodically moved with constant speed, so that the electron trap receives an electron current corresponding to the respective image content. A Faraday cage may serve as an electron trap. However, owing to the weak available electron currents, traps may be used particularly advantageously which inherently provide for an amplification of the electron current. For example, Geiger-Müller counters, scintillation counters, electron multipliers or semiconductor cells may be used as traps. The four last noted traps provide moreover for a considerably improved matching to the amplifier input since they are as compared with the Faraday cage relatively low-ohmic.

Closely above the electron trap is disposed a diaphragm which may be circular or may have a slot formed therein. A slotted diaphragm is suitable when the structures of the specimen exhibit a preferential direction. The direction of the slot must in such case be adjustable according to the preference direction. The diameter of the diaphragm or slot width, respectively, shall not be smaller than will correspond to the resolution of a plate employed in the photographic exposure.

An electrical field or a magnetic field may be used as a deflection field. In case the electron microscope is provided with an electrostatic or an electromagnetic lens stigmator, the sawtooth-like deflection voltage may be respectively supplied at two oppositely disposed electrodes or at oppositely disposed magnet systems. It is even in such case relatively simple to change the direction of deflection corresponding to the direction of the image structure.

An electrostatic or electromagnetic stigmator serves, in known manner, to compensate, by means of a suitable correction field, an astigmatism which is inherent in the objective. The correction is thereby normally effected without shifting the image, since the stigmator produces a correction which is zero in the optical axis, thus avoiding bending of the optical axis. It is, however, possible, by superimposing an auxiliary voltage at two oppositely disposed electrodes (plates) or magnet poles of the respective stigmator, to produce a transverse field which is wholly independent of the normal correction field, such transverse field bringing about a bending of the optical axis and therewith a shifting of the terminal image. Accordingly, the electrodes or coils of the respective stigmators serve as devices for producing the deflection fields according to the invention.

The arrangement according to the invention employs for indicating purposes, in a manner to be presently explained, narrow band amplifier which must have a relatively small band width so that the operatively effective current is sufficiently out of the noise level. For example, of the known circuits, resonance amplifiers with oscillating quartzes or superimposing amplifiers, may be used for the purpose in view.

A further advantage will be obtained by using the electron trap in known manner for measuring the current density of the terminal image or for the determination of the exposure time. The terminal image stands thereby suitably still. A measurement of the current density of the terminal image is, for example, necessary for thickness measurements in connection with electron microscopic objects.

The invention will now be described with reference to the accompanying drawings.

Figure 1:
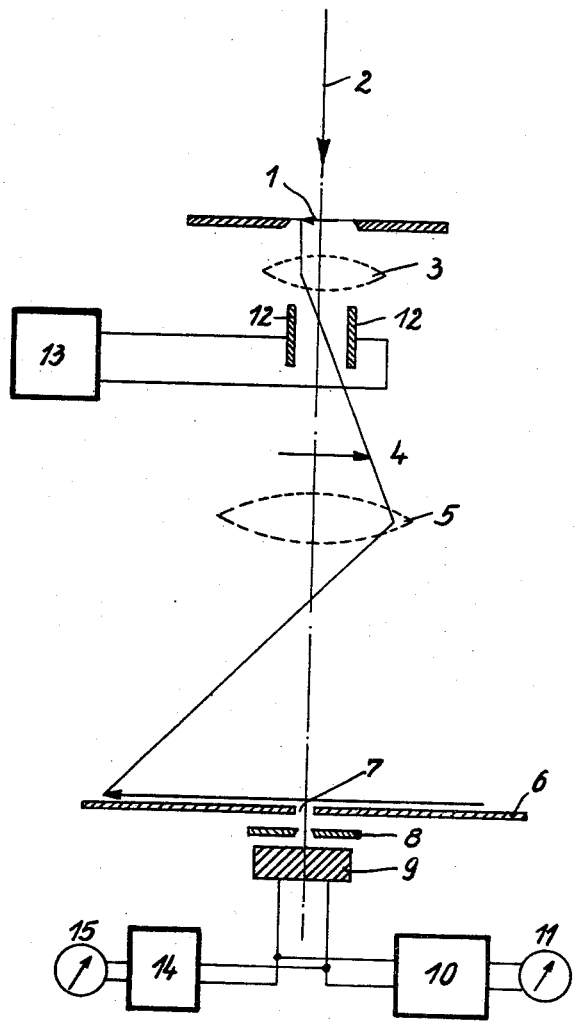
FIG. 1 shows in schematic manner the imaging part of a two-stage electron microscope employing electrostatic deflection plates.
Figure 2:
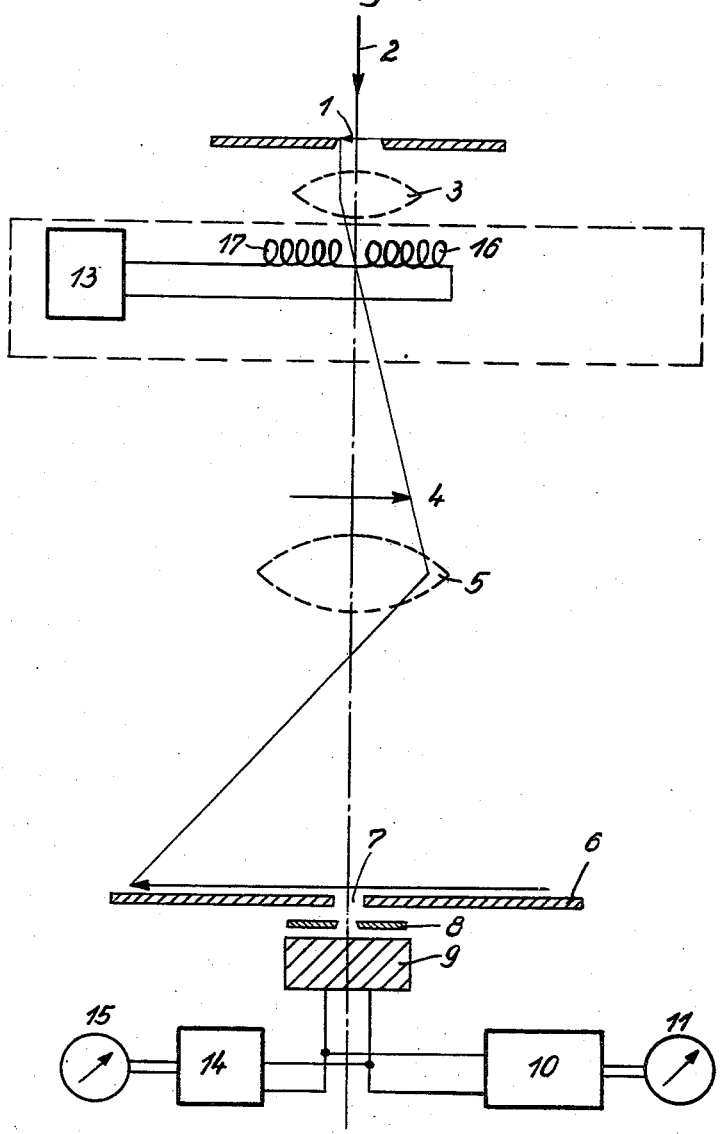
FIG. 2 represents an arrangement similar to the one shown in FIG. 1, but employing, in place of the electrostatic deflection plates, coils for producing a magnetic deflection field.
Figure 3:
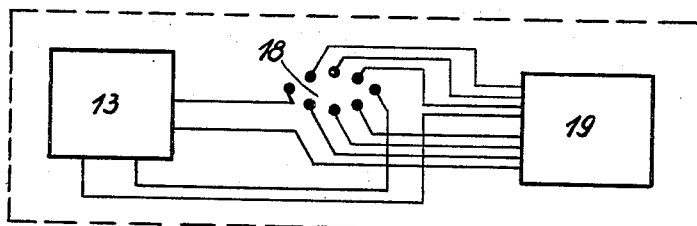
Figure 4:
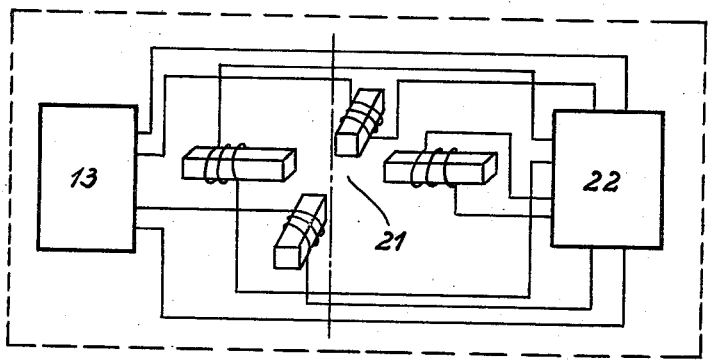
Figure 5:
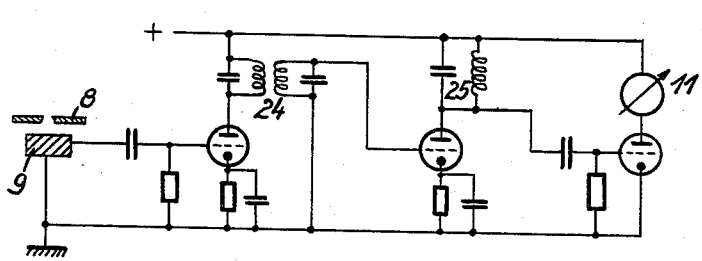
Figure 6:
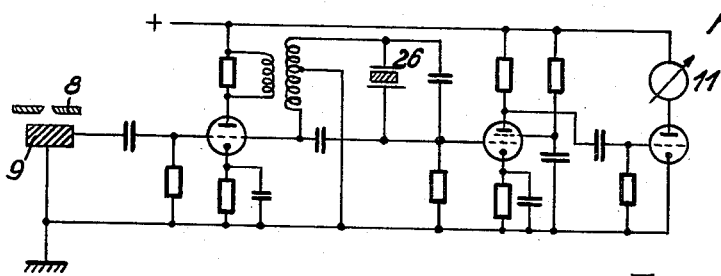

FIG. 3 indicates an electrostatic stigmator which may be used in place of the electromagnetic deflection coils shown within the dash line rectangle in FIG. 1;

FIG. 4 shows an electromagnetic stigmator which may likewise be used for deflection purposes in place of the electromagnetic deflection coils shown within the dash line rectangle in FIG. 2;

FIG. 5 shows a simple resonance amplifier for use as a narrow band amplifier schematically indicated at 10 in FIGS. 1 and 2; and FIG. 6 represents a quartz resonance amplifier which may be used in place of the simple resonance amplifier shown in FIG. 5.

The embodiment according to FIG. 1 shows the imaging part of a two-stage electron microscope in which the specimen 1 which is irradiated with electrons propagated in the direction 2, is by means of a schematically indicated objective (lens 3 magnified to an intermediate image 4 and is thereupon, by means of a likewise schematically shown projective (lens) 5, magnified to a terminal image upon the viewing screen 6. Ahead of the aperture 7 in the viewing screen 6, as seen in the direction of electron propagation, are disposed the diaphragm 8 and the semiconductor cell 9, the latter acting as an electron trap. The semi-conductor cell 9 is connected with the indicating instrument 11 by means of the narrow band amplifier 10. The device according to the invention comprises in the illustrated example electrostatic deflection plates 12 which are for the image wobbling connected with the sawtooth wave generator 13. The maximum deflection of the indicating instrument 11 constitutes a criterion for the best definition of the image. Numeral 14 indicates a direct current amplifier connected with the electron trap 9 and in turn connected with an indicating instrument 15, serving with disconnected sawtooth wave generator (terminal image standing still) as a current density and exposure meter.

FIG. 2 shows in schematic manner an arrangement similar to the one illustrated in FIG. 1, but employing, in place of the electrostatic deflection field which is in FIG. 1 produced by the deflection plates 12, a magnetic deflection field which is in known manner produced by two coils 16 and 17, such coils being disposed directly below the objective 3 and being connected with a sawtooth-wave generator 13.

Instead of using the electromagnetic deflection means, shown in FIG. 2 within the dash line rectangle (coils 16, 17 and generator 13), there may be used an electrostatic stigmator 18, indicated in FIG. 3, which is in known manner employed for the correction of the astigmatism of the objective and which is connected with a circuit 19 and with a sawtooth wave generator 13, so as to produce the desired deflection field. The stigmator 18 comprises in such case eight electrostatic poles which are arranged about the optical axis in one plane extending perpendicularly thereto. The circuit 19 comprises known means for adjusting the magnitude and direction of the correcting action. The sawtooth-wave generator 13 extends to two desired mutually oppositely disposed poles of the stigmator and applies an auxiliary sawtooth shaped voltage which is independent of the correction voltage, such auxiliary voltage producing, contrary to the correction voltage, a field which bends the electron beam, therewith effecting periodic shifting of the terminal image.

The deflection means may also be in the form of a device such as shown in FIG. 4, comprising an electromagnetic stigmator 21 provided with four coils, the correction direction of which is adjusted by rotation of the entire coil system. A periodically effective transverse deflection field is again superposed, by means of the sawtooth-wave generator 13, on the correction field of two mutually oppositely disposed coils, such deflection field bringing about the desired shifting of the terminal image. Numeral 22 indicates a circuit corresponding to the one shown in FIG. 3 at 19, which circuit likewise contains known means for adjusting the magnitude of the correction effect.

FIGS. 5 and 6 show examples of narrow band amplifiers which may respectively be used in the place of the amplifier shown schematically at 10 in FIGS. 1 and 2. FIG. 5 shows a simple resonance amplifier and FIG. 6 shows a quartz resonance amplifier.

In the resonance amplifier according to FIG. 5, the electron trap 9 (see also FIGS. 1 and 2), ahead of which is disposed the diaphragm 8, is connected with an amplifier circuit which produces the desired narrow band width by the action of a band filter 24 cooperating with a blocking circuit 25.

The quartz resonance amplifier according to FIG. 6, which is connected with the trap 9 as in FIG. 5, is provided with a resonance circuit comprising a quartz oscillator 26.

The rectified output signal is in both circuits (FIGS. 5 and 6) indicated by means of a current meter 11, also indicated in FIGS. 1 and 2.

Changes may be made within the scope and spirit of the appended claims which define what is believed to be new and desired to have protected by Letters Patent.

I claim:

1. An electron microscope comprising an electron trap disposed substantially in the terminal image plane and having apparatus for sharply defining the image, said apparatus comprising a device situated at a point in the imaging part of the microscope for imparting to the terminal image a relative shifting motion with respect to said trap so as to produce harmonic waves, an narrow band amplifier, circuit means extending from said electron trap to said amplifier for supplying thereto electron current, said amplifier being operative to amplify only a relatively narrow frequency band within the range of the highest harmonic wave that is to be expected in the electron current received from said trap, and an indicating device connected with said narrow band amplifier for optically indicating the amplitude of the amplified harmonic wave as a criterion for the sharp definition of the image.

2. Electron microscope according to claim 1, wherein said device for imparting to the terminal image a relative shifting motion with respect to the electron trap is disposed at a region lying between the specimen and the terminal image, said device producing deflection fields for the electron beam.

3. Electron microscope according to claim 2, wherein said deflection fields are electric fields.

4. Electron microscope according to claim 2, wherein said deflection fields are magnetic fields.

5. Electron microscope according to claim 2, wherein the course of the deflection field is sawtooth-like as to time.

6. Electron microscope according to claim 2, wherein the deflection field is a rotary field.

7. Electron microscope according to claim 2, wherein the electrodes of an electrostatic stigmator cooperatively associated with one of the imaging elements in the imaging part of said electron microscope serve as a device for producing said deflection fields.

8. Electron microscope according to claim 2, wherein the coils of an electromagnetic stigmator cooperatively associated with one of the imaging elements in the imaging part of said electron microscope serve as a device for producing said deflection fields.

9. Electron microscope according to claim 1, comprising a circular-aperture diaphragm for defining the sensitive range of said electron trap.

10. Electron microscope according to claim 1, comprising a slotted-aperture diaphragm for defining the sensitive range of said electron trap.

11. Electron microscope according to claim 1, wherein said narrow band amplifier is a resonance amplifier.

12. Electron microscope according to claim 1, wherein said narrow band amplifier is a quartz resonance amplifier.

13. Electron microscope according to claim 1, wherein said narrow band amplifier is a superimposing amplifier.

14. Electron microscope according to claim 1, comprising means cooperatively associated with said electron trap for measuring the current density in the terminal image and the exposure time, respectively.

15. Electron microscope according to claim 14, wherein said last named means comprises a direct current amplifier connected with said electron trap and an indicating instrument connected with such direct current amplifier.

16. Electron microscope according to claim 1, wherein the electron trap is of a type which is inherently operative to amplify the electron stream.

References Cited in the file of this patent

UNITED STATES PATENTS

| | | |
|---|---|---|
| 2,464,396 | Hillier et al. | Mar. 15, 1949 |
| 2,561,988 | Longini | July 24, 1951 |
| 2,660,669 | West | Nov. 24, 1953 |